(12) United States Patent
Zhang et al.

(10) Patent No.: US 8,700,812 B2
(45) Date of Patent: Apr. 15, 2014

(54) METHODS, DEVICES AND COMMUNICATION SYSTEMS FOR DATA CARD IDENTIFICATION OPERATING SYSTEM

(75) Inventors: Dongfeng Zhang, Shenzhen (CN); Zhenhui Nie, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 336 days.

(21) Appl. No.: 13/219,018

(22) Filed: Aug. 26, 2011

(65) Prior Publication Data

US 2012/0054384 A1    Mar. 1, 2012

(30) Foreign Application Priority Data

Aug. 26, 2010  (CN) .......................... 2010 1 0268780

(51) Int. Cl.
*G06F 3/00* (2006.01)
(52) U.S. Cl.
USPC .................................. 710/8; 710/15; 710/62
(58) Field of Classification Search
None
See application file for complete search history.

(56) References Cited

U.S. PATENT DOCUMENTS

| | | | |
|---|---|---|---|
| 2008/0005370 A1* | 1/2008 | Bolan et al. ........................ 710/8 |
| 2009/0248907 A1 | 10/2009 | Huang et al. | |
| 2011/0119686 A1* | 5/2011 | Chen .............................. 719/326 |
| 2011/0173639 A1 | 7/2011 | Coronado et al. | |
| 2012/0054372 A1* | 3/2012 | Chen et al. ....................... 710/13 |
| 2013/0042029 A1* | 2/2013 | Lu et al. .......................... 710/15 |

FOREIGN PATENT DOCUMENTS

| | | |
|---|---|---|
| CN | 101957807 A | 1/2008 |
| EP | 1622011 A2 | 2/2006 |
| WO | WO 03/012577 A2 | 2/2003 |

OTHER PUBLICATIONS

Extended European search report pursuant to Rule 62 EPC, the European search report (R. 61 EPC) or the partial European search report / declaration of no search (R. 63 EPC) and the European search opinion related to Int'l Application No. 11006967.1-1229; mailed Nov. 28, 2011 for Huawei Tech Co. Ltd. (7 pgs.).

* cited by examiner

*Primary Examiner* — Idriss N Alrobaye
*Assistant Examiner* — Dayton Lewis-Taylor

(57) ABSTRACT

A method for a data card to identify an OS, an apparatus and a communication system thereof are provided according to the embodiments of the present invention. The method includes: receiving, by a USB device through a disc port, an SCSI command sent by the OS to be identified; and upon receiving an SCSI command carrying operation code 0XBB, identifying that the OS to be identified is Mac OS; upon receiving an SCSI command carrying operation code 0XA2, identifying that the OS to be identified is Windows Vista SP2 or later versions of Windows OS. With the technical solutions provided in the embodiments of the present invention, no dedicated driver programs need to be developed for some OSs to identify these OSs.

15 Claims, 4 Drawing Sheets

METHODS, DEVICES AND COMMUNICATION SYSTEMS FOR DATA CARD IDENTIFICATION OPERATING SYSTEM

CROSS-REFERENCE TO RELATED APPLICATIONS

This application claims priority to Chinese Patent Application No. 201010268780.X, filed on Aug. 26, 2010, which is hereby incorporated by reference in its entirety.

FIELD OF THE INVENTION

The present invention relates to communication technologies, and in particular, to a method for the data card to identify the operating system (OS), and an apparatus and a communication system thereof.

BACKGROUND OF THE INVENTION

The data card is a type of plug-and-play universal serial bus (USB) device, which supports different types of OSs (such as Windows® and Mac® OS) or different versions of the same type of OS (such as Windows XP® or Windows 7®). Due to the difference between different types of OSs and the difference between different versions of OSs, different parameters need to be set for the data card according to different OSs. Therefore, it is necessary for the data card to obtain the type and version of the current OS. However, currently, the interface protocol for the USB device does not define such an interface. Consequently, the data card cannot easily obtain the type and version of the current OS.

The prior art provides a method for identifying the OS. The method includes as follows: The data card first sets a working port to a specific port in non-working mode; the OS loads the user-defined driver program to the port and sends to the data card a message, which contains information about the OS type and version, by using the driver program; the data card determines the OS type and version according to this message, cancels the setting of the specific port in non-working mode, sets parameters for the working port according to the OS type and version, and reports the information about the working port. Subsequently, data can be transmitted between the data card and OS.

The prior art has the following disadvantages:

In the prior art, by using dedicated driver programs developed for the port in non-working mode, the message, which contains information about the OS type and version, can be sent to the data card. Because there are many types of OSs and there are different versions for the same type of OS, multiple driver programs need to be developed, which is complex and consumes much manpower.

SUMMARY OF THE INVENTION

Embodiments of the present invention provide a method for the data card to identify the OS, and an apparatus and a communication system thereof. With the method, apparatus, and system, the OS can be identified without the need of developing dedicated driver programs for some OSs.

Accordingly, the embodiments of the present invention provide the following.

A method for a USB device to identify an OS includes:

receiving, by a USB device through a disk port, a small computer system interface (SCSI) command sent by the OS to be identified; and upon receiving an SCSI command carrying operation code 0XBB, identifying that the OS to be identified is Mac® OS;

upon receiving an SCSI command carrying operation code 0XA2, identifying that the OS to be identified Windows Vista® SP2 or later version of Windows® OS.

A USB device includes:

a disk port, configured to receive an SCSI command sent by the OS to be identified;

a judging unit, configured to judge whether the received SCSI command is an SCSI command carrying operation code 0XBB or an SCSI command carrying 0XA2; and an identifying unit, configured to identify that the OS to be identified is Mac® OS upon receiving the SCSI command carrying operation code 0XBB, and identify that the OS to be identified Windows Vista® SP2 or later version of Windows® OS upon receiving the SCSI command carrying operation code 0XA2.

A communication system includes the USB device and computer; wherein the computer runs an OS.

The OS is configured to send, through a disc port, an SCSI command after detecting that the disc port on the USB device is connected to the computer.

According to embodiments of the present invention, the USB device is arranged with a disc port, and driver programs for USB discs are provided for most OSs. Accordingly, the USB device may receive, through the disc port, a small computer system interface (SCSI) command sent by the OS. If the SCSI command carries operation code 0XBB, it is determined that the OS to be identified is Mac® OS; if the SCSI command carries operation code 0XA2, it is determined that the OS to be identified is Windows Vista® SP2 or later versions of Windows® OS. In this way, it is unnecessary to develop dedicated driver programs for Mac® OS and Windows Vista® SP2 or later versions.

BRIEF DESCRIPTION OF THE DRAWINGS

To make the technical solutions of the embodiments of the present invention clearer, the accompanying drawings for illustrating the embodiments of the present invention or the prior art are outlined below. Apparently, the accompanying drawings are for the exemplary purpose only, and persons of ordinary skill in the art can derive other drawings from the accompanying drawings without any creative effort.

DETAILED DESCRIPTION OF THE EMBODIMENTS

Figure 1:
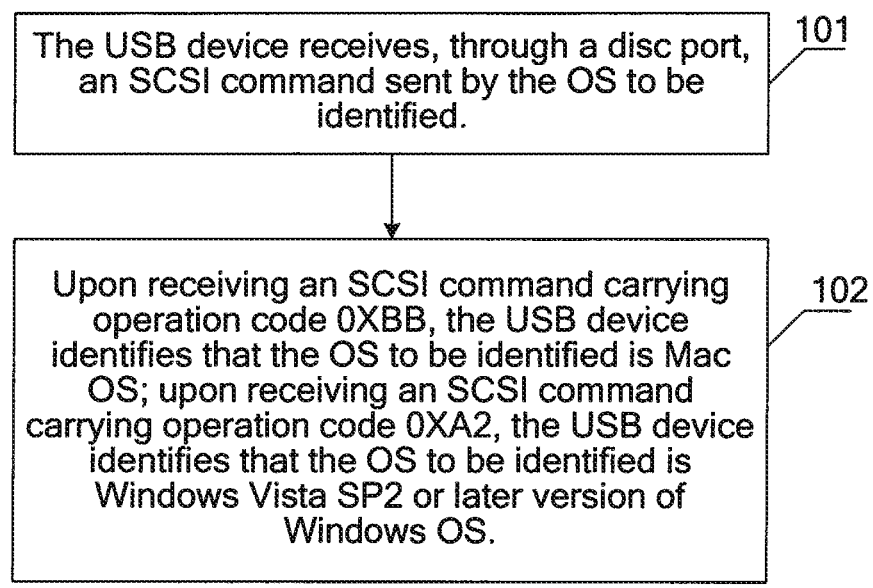
FIG. 1 is a flowchart of a method for the data card to identify an OS according to an embodiment of the present invention.

As illustrated in FIG. 1, the method for a USB device to identify an OS includes as follows.

101: The USB device receives, through a disc port, an SCSI command sent by the OS to be identified.

The USB device according to the embodiments of the present invention is arranged with a disc port before delivery.

By using this port, the USB device may receive the SCSI command sent by the OS. The USB device according to the embodiments of the present invention may be a data card or other USB devices, which does not affect the implementation of the present invention.

102: Upon receiving an SCSI command carrying operation code 0XBB, the USB device identifies that the OS to be identified is Mac® OS; upon receiving an SCSI command carrying operation code 0XA2, the USB device identifies that the OS to be identified is Windows Vista® SP2 or later version of Windows® OS.

The OS generally includes three types: Windows® OS, Mac® OS, and Linux® OS. The Windows® OS has multiple versions, for example, Windows XP® or Windows 2000®, Windows 7®, and Windows Vista® SP2, and these versions of OSs send different SCSI commands. Windows 7® and Windows Vista® SP2 are later versions of Windows® OSs. As the SCSI command sent by these two versions of OSs carries operation code 0XA2, Windows 7® and Windows Vista® SP2 belong to the same version category. Windows XP® or Windows 2000®, however, is earlier version of Windows® OS. As the SCSI command sent by Windows XP® or Windows 2000® does not carry operation code 0XA2, Windows XP® or Windows 2000® is another version category of Windows® OS.

When the SCSI command carrying operation code 0XBB or the SCSI command carrying operation code 0XA2 is not received, the USB device displays the installation program and driver program on the disc port, controls the OS to be identified to run the installation program after receiving from the user the instruction for running the installation program and installs the driver program on the OS, according to the result of the identification performed by the running installation program on the OS that is to be identified. The USB device receives an indication message that is sent through the installed driver program, by the OS to be identified. The indication message includes the type of the OS to be identified, and when the OS to be identified has different versions, the indication message may further include the version of the OS to be identified. The driver program installed on the OS to be identified is dedicated to the OS. In this way, for an OS such as Linux® OS or Windows XP® or Windows 2000® OS, dedicated driver program needs to be developed for the OS and the dedicated driver program is saved on the USB device. After the installation program identifies the OS, the driver program for the OS is installed on the OS so that the OS can use the driver program to notify the USB device of the OS type, and the OS can use the driver program to notify the USB device of the OS version if the OS has different versions.

According to embodiments of the present invention, the USB device is arranged with a disc port. Accordingly, the USB device can receive, through the disc port, an SCSI command sent by the OS. If the SCSI command carries operation code 0XBB, the USB device determines that the OS to be identified is Mac® OS; if the SCSI command carries operation code 0XA2, the USB device determines that the OS to be identified is Windows Vista® SP2 or later version of Windows® OS. Unlike the prior art, it is unnecessary to develop dedicated driver programs for Mac® OS and Windows Vista® SP2 or later versions.

Figure 2:
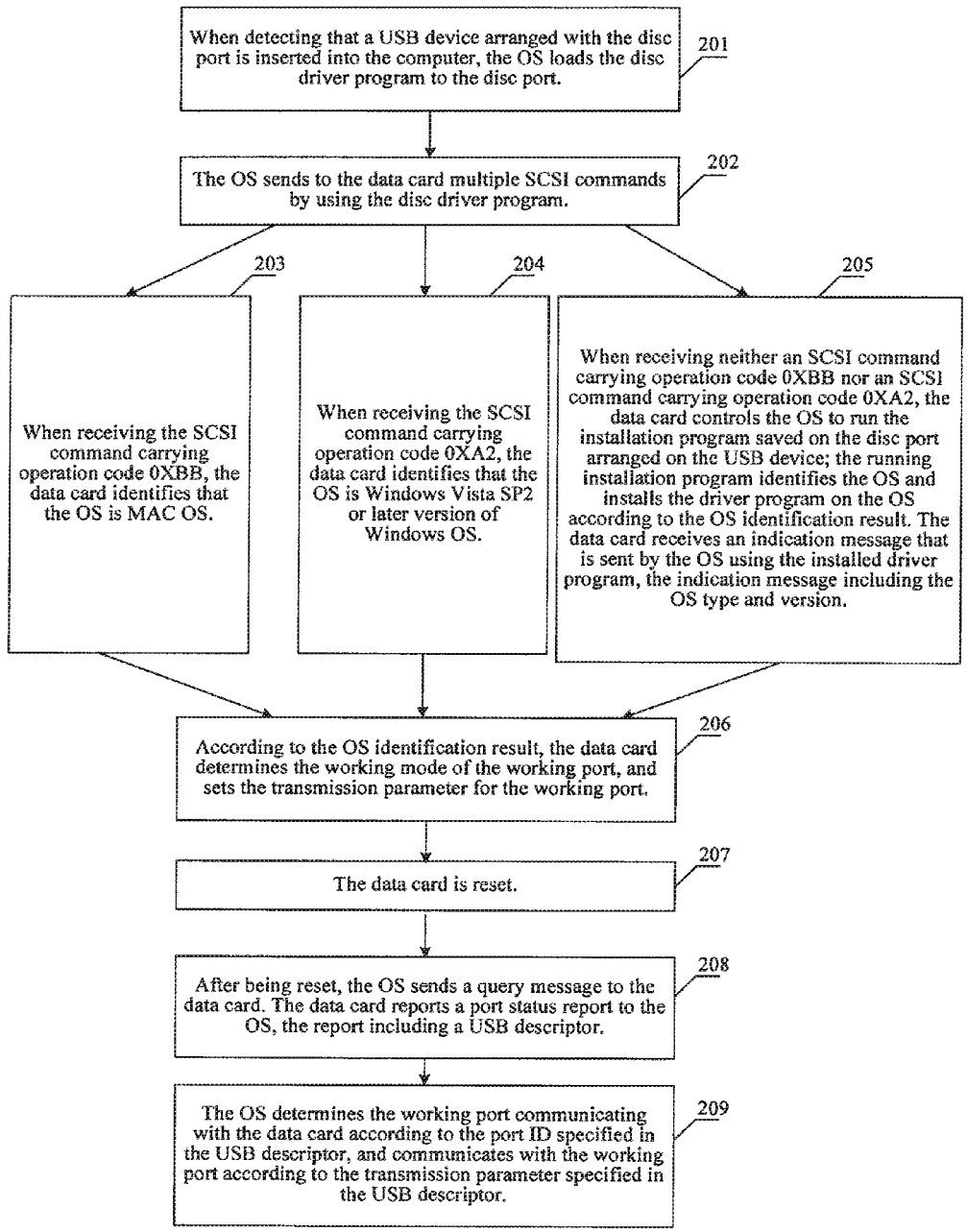
FIG. 2 is a flowchart of a method for the data card to identify an OS according to another embodiment of the present invention.

To make the technical solutions provided by the embodiments of the present invention clearer, the following two embodiments describe the technical solutions in detail. FIG. 2 illustrates a method for a USB device to identify an OS according to an embodiment of the present invention. In the embodiment, the working port on the data card can be applicable to different types and versions of the OSs. The embodiment includes as follows.

201: When detecting that a USB device arranged with the disc port is inserted into the computer, the OS loads the default disc driver program to the disc port.

In this step, the OS is an OS to be identified.

202: The OS sends to the data card multiple SCSI commands through the disc driver program.

If the OS is Mac® OS, an SCSI command sent by the OS carries operation code 0XBB, where 0XBB indicates that this command is SET CD-ROM SPEED command. If the OS is Windows 7® or Windows Vista® SP2, an SCSI command sent by the OS carries operation code 0XA2, where 0XA2 indicates that this command is SECURITY PROTOCOL IN command. If the OS is other version of Windows® OS, an SCSI command sent by the OS does not carry operation code 0XA2 or 0XBB.

203: When receiving the SCSI command carrying operation code 0XBB, the data card identifies that the OS is Mac® OS.

204: When receiving the SCSI command carrying operation code 0XA2, the data card identifies that the OS is Windows Vista® SP2 or later version, such as Windows 7®.

205: When receiving neither an SCSI command carrying operation code 0XBB nor an SCSI command carrying operation code 0XA2, the data card displays the installation program and the driver program on the disc port arranged on the USB device, and controls the OS to run the installation program after receiving the instruction for running the installation program from the user. The running installation program identifies the OS, and the driver program is installed on the OS according to the identification result. The data card receives an indication message that is sent, through the installed driver program, by the OS. The indication message includes the OS type, and when the OS has different versions, the indication message further includes the version of the OS.

The installation program and driver program need to be saved in advance on the disc port arranged on the USB device. The saved driver programs include driver programs of other OSs except Mac® OS, Windows Vista® SP2 and later versions of Windows® OSs, for example, the driver programs for Linux® and Windows XP® or Windows 2000®.

206: The data card determines, according to the identification result of the OS, the working mode of the working port connected to the OS, and sets, according to the determined working mode, the transmission parameter for the working port.

In this step, one or multiple working ports may be arranged on the data card. If multiple working ports are arranged on the data card, the data card described in the step can select any working port to connect to the communication system. It should be noted that, no matter how many working ports are arranged on the data card, when the working ports are connected to different OSs, the working ports work in different modes. In the embodiments of the present invention, different types of OSs are different OSs, and the OSs of the same type but in different version categories are also different OSs. The OS version category is determined according to the level of the OS version. For example, the Windows® OS has multiple versions, such as Windows XP® or Windows 2000®, Windows 7®, and Windows Vista® SP2. Windows 7® and Windows Vista® SP2 belong to the same version category, and they are both the Windows® OS of later version. The SCSI command sent by Windows 7® and Windows Vista® SP2 carries operation code 0XA2. Windows XP® or Windows® 2000 belongs to another version category, and it is the Windows® OS of earlier version. The SCSI command sent by Windows XP® or Windows 2000® does not carry operation code 0XA2. Therefore, Windows XP® or Windows 2000® and Windows 7® are two different OSs.

When the working ports are connected to different OSs, they work in different modes, so in this step, the data card needs to determine the working mode of the working port connected to the OS, according to the OS type, or according to the version category when this type of OS has multiple versions, and set the transmission parameter for the working port according to the determined working mode. The transmission parameter for the working port may include the data transmission rate.

It should be noted that if the data card cannot identify the OS in steps 203 and 204 and the OS type and version are obtained from the indication message sent, through the installed driver program, by the OS in step 205, the data card determines the OS version category according to the OS version to determine the working mode corresponding to the working port.

207: The data card is reset.

208: After detecting that the data card is reset, the OS identifies the device again and sends a query message to the data card. The data card reports a port status report to the OS. The port status report includes a USB descriptor. The USB descriptor includes a port ID (an ID of the working port connected to the OS), a protocol ID used by the working port, and a transmission parameter of the working port.

209: After receiving the USB descriptor, the OS determines, according to the port ID specified in the USB descriptor, the working port communicating with the data card, and communicates with the working port according to the transmission parameter specified in the USB descriptor.

Specifically, the OS sends data to the data card according to the data transmission rate set on the data card.

According to the embodiments of the present invention, the data card is arranged with the disc port. Accordingly, the data card may receive, through the disc port, the SCSI command sent by the OS, and identify Mac® OS and Windows Vista® SP2 or later versions according to the operation code carried in the SCSI command. Therefore, unlike the prior art, it is unnecessary to develop dedicated driver program for Mac® OS and Windows Vista® SP2 or later versions. Further, according to the OS type and version category, the working mode of the working port is determined, the transmission parameter is set for the working port, and the set transmission parameter is transmitted to the OS, so that the OS can communicate with the data card.

Figure 3:
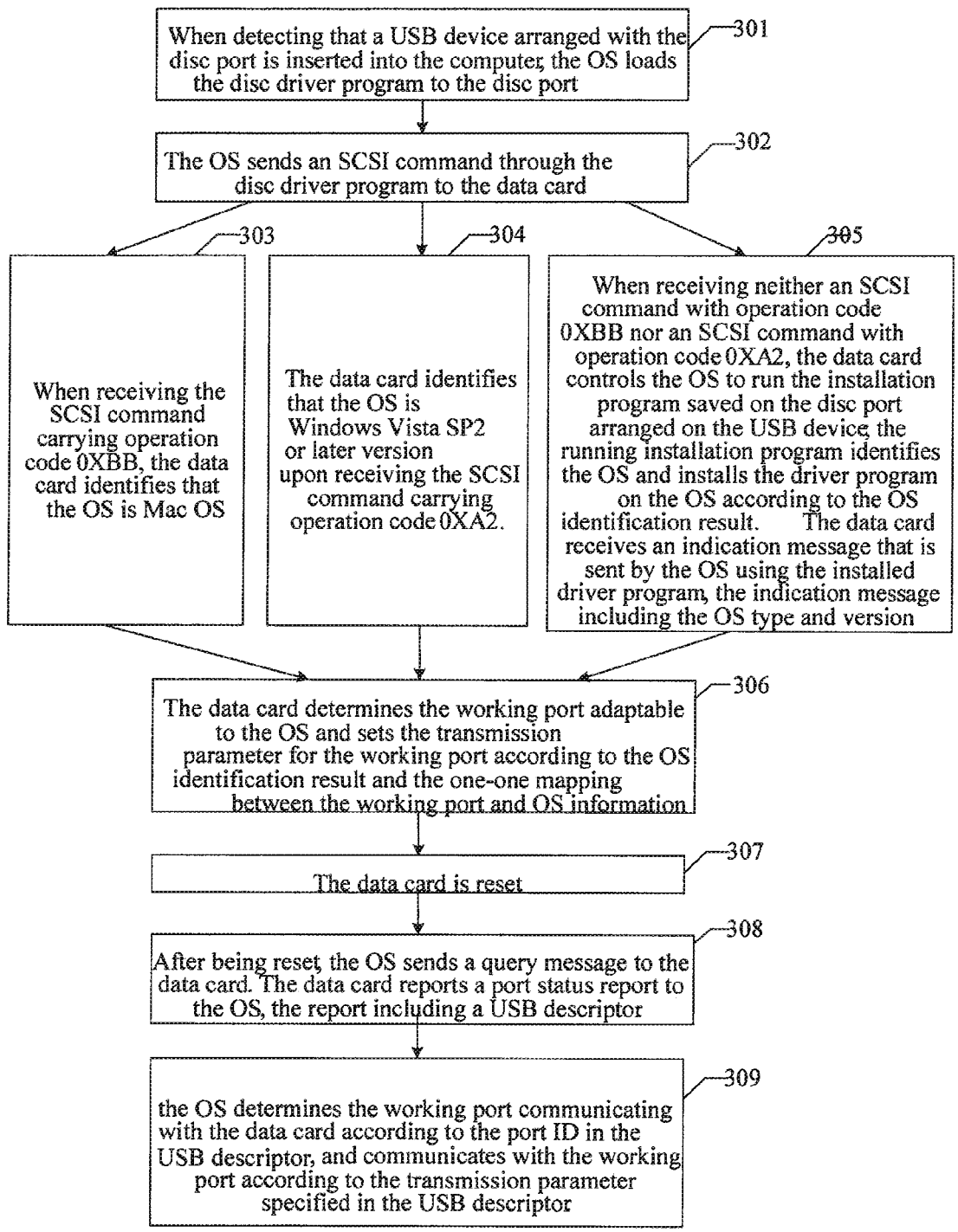
FIG. 3 is a flowchart of a method for the data card to identify an OS according to yet another embodiment of the present invention.

Referring to FIG. 3, a method for a USB device to identify an OS according to another embodiment of the present invention is illustrated. This embodiment is different from the embodiment illustrated in FIG. 2 in that: the data card is arranged with multiple working ports corresponding to information about different OSs. The OS information includes the OS type. When the OS has different versions, the OS information further includes the OS version category. The method specifically includes as follows.

Steps 301-305 are the same as steps 201-205; therefore these steps are not described here.

306: The data card determines the working port adaptable to the OS and sets the transmission parameter for the working port according to the identification result of the OS and the one-to-one mapping between the working port and OS information.

Before step 306, the data card pre-sets one-to-one mapping between the working port and OS information. That is, information about different OSs is set to map with different working ports respectively. The OS information includes the OS type. When the OS has different versions, the OS information further includes the OS version category. For example, the OS information of Windows® OS further includes the OS version category, here, the OS version category indicates whether the OS version is Windows Vista® SP2 or later version or is an OS version earlier than Windows Vista® SP2 (excluding Windows Vista® SP2).

For example, the data card is arranged with multiple working ports, including two modem ports, and one network port. The first modem port can be configured to correspond to Windows® OS later than Windows Vista® SP2, and the second modem port can be configured to correspond to Windows® OS earlier than Windows Vista® SP2 (excluding Windows Vista® SP2), and the network port can be configured to correspond to Mac® OS. If the OS to be identified is Mac® OS, the network port is selected and the transmission parameter is set for the working port. If the OS is Windows Vista® SP2 or a later version, the first modem port is selected and the transmission parameter is set for the working port.

Steps 307-309 are the same as steps 207-209; therefore these steps are not described here.

According to the embodiments of the present invention, the data card is arranged with the disc port. Accordingly, the data card can receive, through the disc port, the SCSI command sent by the OS, and identify Mac® OS and Windows Vista® SP2 or later versions according to the operation code carried in the SCSI command. Therefore, unlike the prior art, it is unnecessary to develop dedicated driver program for Mac® OS and Windows Vista® SP2 or later versions. Further, according to the OS type and version category, a working port is selected from multiple working ports, and the transmission parameter is set for the working port and the set transmission parameter is transmitted to the OS, so that the OS can communicate with the data card.

The foregoing two embodiments use the data card as an example to illustrate the technical solutions. It is apparent for those skilled in the art that the technical solutions provided in the two embodiments are applicable to any USB device.

Figure 4:
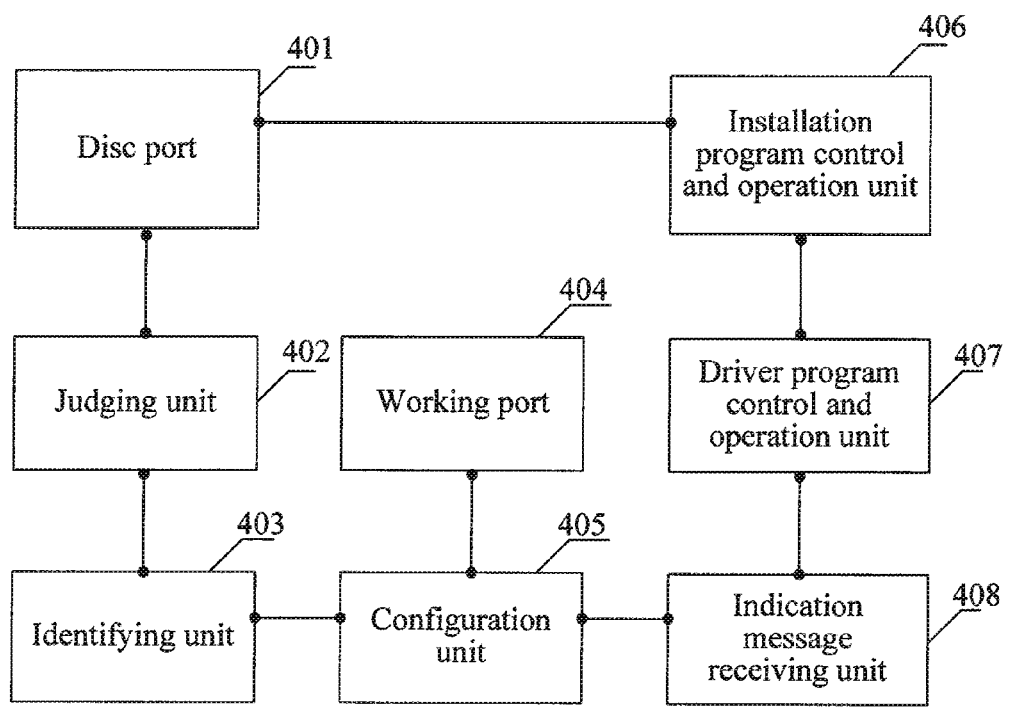
FIG. 4 is a structure view of a USB device according to an embodiment of the present invention.

Referring to FIG. 4, a USB device is provided according to an embodiment of the present invention. The USB device includes: a disc port 401, a judging unit 402, an identifying unit 403. The USB device may be a data card or other USB device.

The disc port 401 is configured to receive an SCSI command sent by the OS to be identified.

A judging unit 402 is configured to judge whether the received SCSI command is an SCSI command carrying operation code 0XBB or an SCSI command carrying 0XA2.

The identifying unit 403 is configured to identify that the OS to be identified is Mac® OS upon receiving the SCSI command carrying operation code 0XBB, and identify that the OS to be identified is Windows Vista® SP2 or later version of Windows® OS upon receiving the SCSI command carrying operation code 0XA2.

For implementing the communication between a USB device and the OS, the USB device further includes: a working port 404 and a configuration unit 405.

The working port can be configured in two modes:

Mode 1: Each working port of the USB device is applicable to different OSs; the configuration unit 405 is specifically configured to determine the working mode of the working port according to the identification result obtained by the identifying unit 403, and set the transmission parameter for the working port according to the working mode of the working port.

Mode 2: The USB device further includes: multiple working ports, and each working port and information about each OS among the different OS are in one-to-one mapping; the OS information includes the OS type, and when the OS has different versions, the OS information further includes the OS version category; in such a case, the configuration unit 405 is configured to determine the working port adaptable to the OS to be identified and set the transmission parameter for the working port according to the identification result obtained from the identifying unit 403 and the one-to-one mapping between the working port and OS information.

For communicating with the OS, the working port 404 is configured to send a USB descriptor to the OS to be identified. The USB descriptor includes an ID and a transmission parameter of the working port adaptable to the OS to be identified. The USB descriptor further includes a protocol ID used by the working port.

Optionally, for identifying the OS, the USB device further includes: an installation program control and operation unit 406, configured to receive the instruction for running the installation program from the user, and control the OS to be identified to run the installation program when the SCSI command carrying operation code 0XBB or the SCSI command carrying operation code 0XA2 is not received; a driver program control and operation unit 407, configured to install the driver program on the OS according to the result of the identification performed by the running installation program on the OS that is to be identified; and an indication message receiving unit 408, configured to receive an indication message sent, through the driver program, by the OS to be identified, where the indication message includes the OS type, and when the OS has different versions the indication message further includes the OS version.

The configuration unit 405 is configured to determine the working mode of the working port according to the indication message received by the indication message receiving unit 408 and set the transmission parameter for the working port according to the working mode of the working port; alternatively, the configuration unit 405 is configured to determine the working port adaptable to the OS to be identified and set the transmission parameter for the working port according to the indication message received by the indication message receiving unit 408 and according to the one-to-one mapping between the working port and the OS information.

According to the embodiments of the present invention, the USB device is arranged with the disc port. Accordingly, the USB device can receive, through the disc port, the SCSI command sent by the OS, and can identify Mac® OS and Windows Vista®SP2 or later versions according to the operation code carried in the SCSI command. Therefore, unlike the prior art, it is unnecessary to develop dedicated driver program for Mac® OS and Windows Vista® SP2 or later versions.

Figure 5:
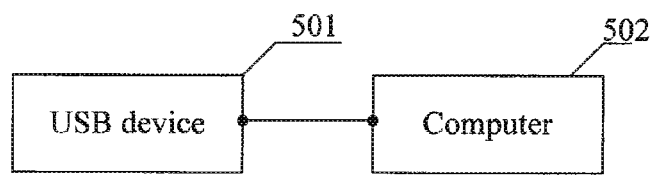
FIG. 5 is a structure view of a communication system according to an embodiment of the present invention.

Referring to FIG. 5, a communication system is provided according to an embodiment of the present invention. The communication system includes: a USB device 501 arranged with a disc port, and a computer 502 running an OS.

The USB device is configured to receive, through the disc port, an SCSI command sent by the OS to be identified. Upon receiving an SCSI command carrying operation code 0XBB, the USB device identifies that the OS to be identified is Mac® OS; upon receiving an SCSI command carrying operation code 0XA2, the USB device identifies that the OS to be identified is Windows Vista® SP2 or later version of Windows® OS.

The OS running on the computer 502 is used to load the disc driver program for the disc port, and send the SCSI command to the USB device by using the disc driver program.

Functions of the USB device and the OS running on the computer, and information interaction between the USB device and the OS running on the computer can be referred to the foregoing description of the method and apparatus embodiments, and are not detailed here. Further, the structure of the USB device and functions of the units can be referred to the description of the foregoing apparatus embodiment.

According to the embodiments of the present invention, the USB device is arranged with the disc port. Accordingly, the USB device can receive, through the disc port, the SCSI command sent by the OS, and identify Mac® OS and Windows Vista® SP2 or later versions according to the operation code carried in the SCSI command. Therefore, unlike the prior art, it is unnecessary to develop dedicated driver program for Mac® OS and Windows Vista® SP2 or later versions.

It is understandable to those skilled in the art that all or part of steps of the preceding embodiments can be implemented by a program instructing relevant hardware. The program may be stored in a computer readable storage medium such as a magnetic disk or a compact disk.

The method for a USB device to identify the OS, the apparatus, and the communication are described in detail according to the embodiments of the present invention. Although the principle and embodiments of the invention have been described through some examples, the description of the exemplary embodiments is only for better understanding the method and concept of the present invention, and the invention is not limited to such embodiments. It is apparent that those skilled in the art can make various modifications and variations on the basis of the embodiments and application scope without departing from the concept and protection scope of the invention. The invention is intended to cover the modifications and variations provided that they fall in the protection scope defined by the following claims or their equivalents.

The invention claimed is:

1. A method for a universal serial bus (USB) device to identify an operating system (OS), comprising:
   receiving, by a USB device through a disc port, a small computer system interface (SCSI) command sent by the OS to be identified;
   upon receiving an SCSI command carrying a specific operation code, identifying a type of the OS to be identified according to the specific operation code,
   wherein the USB device comprises one or multiple working ports adaptable to different types of OSs, and
   the method further comprises:
   determining, by the USB device, the working mode of the one or multiple working ports according to the identification result of the OS to be identified, and setting a transmission parameter for the one or multiple working ports according to the working mode of the one or multiple working ports.

2. The method according to claim 1, wherein
   the USB device comprises multiple working ports;
   wherein each working port and information about each OS among different OS are in one-to-one mapping, and the information about the OS comprises OS type, and when the OS has different versions the information about the OS further comprises OS version category;
   the method further comprises:
   determining, by the USB device, the working port adaptable to the OS to be identified and setting the transmission parameter for the working port according to the OS identification result and according to the one-to-one mapping between the working port and OS information.

3. The method according to claim 1, wherein after the transmission parameter is set for the working port, the method further comprises:
sending, by the USB device, a USB descriptor to the OS to be identified, wherein the USB descriptor comprises an ID and the transmission parameter of the working port adaptable to the OS to be identified.

4. The method according to claim 2, wherein after the transmission parameter is set for the working port, the method further comprises:
sending, by the USB device, a USB descriptor to the OS to be identified, wherein the USB descriptor comprises an ID and the transmission parameter of the working port adaptable to the OS to be identified.

5. The method according to claim 1, further comprising:
when the SCSI command carrying the specific operation code is not received, controlling, by the USB device, the OS to be identified to run an installation program on the USB device and installing the driver program on the OS to be identified according to the result of the identification performed by the running installation program on the OS that is to be identified; receiving an indication message that is sent, through the installed driver program, by the OS; wherein the indication message comprises the type of the OS to be identified; when the OS has different versions, the indication message further comprises the version of the OS to be identified.

6. A universal serial bus (USB) device, comprising:
a disc port, configured to receive a small computer system interface (SCSI) command sent by the OS to be identified;
a judging unit, configured to judge whether the received SCSI command is an SCSI command carrying specific operation code;
an identifying unit, configured to identify a type of the OS to be identified according to the specific operation code upon receiving the SCSI command carrying the specific operation code,
wherein the USB device further comprises: one or multiple working ports and a configuration unit,
wherein the one or multiple working ports are adaptable to different OSs, and
the configuration unit is configured to determine the working mode of the one or multiple working ports according to the OS identification result obtained by the identifying unit, and set the transmission parameter for the one or multiple working ports according to the working mode of the one or multiple working ports.

7. The USB device according to claim 6, wherein
the USB device comprises: multiple working ports and a configuration unit; wherein each working port and information about each OS among different OS are in one-to-one mapping, wherein the information about the OS comprises OS type, and when the OS has different versions the information about the OS further comprises OS version category;
the configuration unit is configured to determine the working port adaptable to the OS to be identified and set the transmission parameter for the working port according to the OS identification result obtained by the identifying unit and the one-to-one mapping between the working port and OS information.

8. The USB device according to claim 6, wherein
the working port is configured to send a USB descriptor to the OS to be identified, wherein the USB descriptor comprises an ID and the transmission parameter of the working port adaptable to the OS to be identified.

9. The USB device according to claim 7, wherein
the working port is configured to send a USB descriptor to the OS to be identified, wherein the USB descriptor comprises an ID and the transmission parameter of the working port adaptable to the OS to be identified.

10. The USB device according to claim 6, further comprising:
an installation program control and operation unit, configured to control the OS to be identified to run an installation program on the USB device;
a driver program control and operation unit, configured to install a driver program on the OS to be identified according to the OS identification by the running installation program; and
an indication message receiving unit, configured to receive an indication message sent, through the driver program, by the OS to be identified, wherein the indication message comprises the OS type, and when the OS has different versions the indication message further comprises OS version.

11. A communication system, comprising the USB device according to claim 6 and a computer; wherein the computer runs an operating system (OS); and
the OS is configured to send, through a disc port, a small computer system interface (SCSI) command upon detecting that the disc port on the USB device is connected to the computer.

12. A communication system, comprising the USB device according to claim 7 and a computer; wherein the computer runs an operating system (OS); and
the OS is configured to send, through a disc port, a small computer system interface (SCSI) command upon detecting that the disc port on the USB device is connected to the computer.

13. A communication system, comprising the USB device according to claim 8 and a computer; wherein the computer runs an operating system (OS); and
the OS is configured to send, through a disc port, a small computer system interface (SCSI) command upon detecting that the disc port on the USB device is connected to the computer.

14. A communication system, comprising the USB device according to claim 9 and a computer; wherein the computer runs an operating system (OS); and
the OS is configured to send, through a disc port, a small computer system interface (SCSI) command upon detecting that the disc port on the USB device is connected to the computer.

15. A communication system, comprising the USB device according to claim 10 and a computer; wherein the computer runs an operating system (OS); and
the OS is configured to send, through a disc port, a small computer system interface (SCSI) command upon detecting that the disc port on the USB device is connected to the computer.

* * * * *